July 1, 1958          C. B. YOUNG, JR          2,841,793

MICROWAVE LENS

Filed Jan. 22, 1953          4 Sheets-Sheet 1

INVENTOR.
C. B. YOUNG, JR.

BY *Edward R. Hyde Jr.*

ATTORNEY

July 1, 1958  C. B. YOUNG, JR  2,841,793
MICROWAVE LENS
Filed Jan. 22, 1953  4 Sheets-Sheet 2

INVENTOR.
C. B. YOUNG, JR.
BY Edward R. Hyde Jr.
ATTORNEY

July 1, 1958  C. B. YOUNG, JR  2,841,793
MICROWAVE LENS
Filed Jan. 22, 1953  4 Sheets-Sheet 3

INVENTOR.
C. B. YOUNG, JR.
BY Edward R. Hyde Jr.
ATTORNEY

July 1, 1958 C. B. YOUNG, JR 2,841,793
MICROWAVE LENS

Filed Jan. 22, 1953 4 Sheets-Sheet 4

INVENTOR.
C. B. YOUNG, JR.

BY *Edward R. Hyde Jr.*

ATTORNEY

United States Patent Office 2,841,793
Patented July 1, 1958

2,841,793

MICROWAVE LENS

Cornelius Bryant Young, Jr., Jamaica, N. Y.

Application January 22, 1953, Serial No. 332,626

19 Claims. (Cl. 343—909)

This invention relates to a means for controlling the propagation of electromagnetic waves and more particularly to microwave lenses of the path length delay type.

An object of this invention is to provide a device to adjust the phase of transverse electromagnetic waves.

A further object is to provide a microwave lens capable of passing substantially all of the wave energy presented thereto and wherein a minimum of wave energy is reflected back to the source.

A further object is to provide a microwave lens of high gain and efficiency which, when fed by a point-type source at the focal point, will produce a radiation pattern having a narrow main lobe and negligible minor lobes in both the E and H planes over an extremely broad frequency band.

In general, high frequency electromagnetic waves are emitted from a point-type primary antenna such as a horn radiator in a spherical wave front. In order to readily transmit the wave energy to a distant receiver, the waves must be concentrated to a plane wave front. This phase adjustment of the waves may be effected by a microwave lens of the path length delay type. The latter type lens is made up of a plurality of parallel metallic plates disposed at an angle to the horizontal thereby providing a plurality of paths for different segments of a wave front. The lengths of the parallel plates and consequently the path lengths defined thereby are chosen so as to provide the desired adjustment of phase to different segments of an incident wave. The distance between the parallel plates must be not more than a half wavelength in the operating band to prevent transmission of the second and higher order modes. The plane of each plate is perpendicular to the plane defined by the direction of prapagation and the electric vector of the radio wave passing through the lens. This alignment insures a substantially constant velocity of wave propagation through the air dielectric between the plates.

The invention will be more fully understood from the following description of a specific embodiment thereof taken in connection with the drawings in which—

Figure 1:
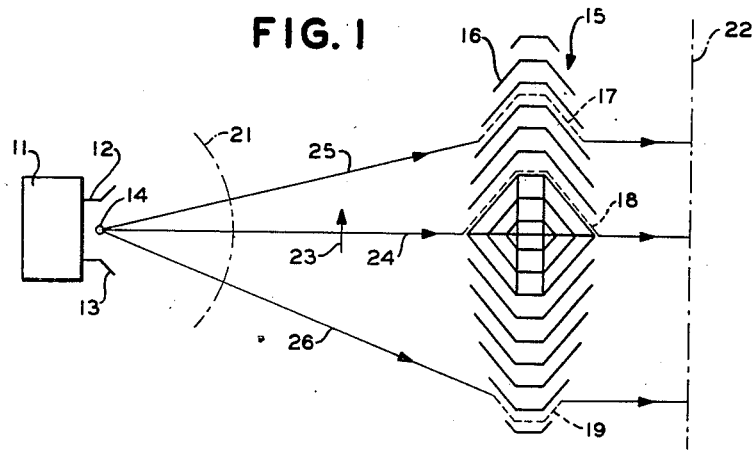
Fig. 1 is a side view of a system illustrating the principles of the invention.

Referring to Fig. 1, there is shown a device 11 which may be a transmitter or receiver. For purposes of illustration, it will be considered a transmitter which connects with a waveguide 12 coupled to an antenna such as a conical horn 13 positioned at the focal point 14 of delay lens 15. The lens is shown as formed of a number of trough-shaped plates 16 positioned to form an assembly symmetric with respect to a horizontal plane passing through the axis of the lens. The contour of the plates will be more fully described hereinafter. For the present, it need only be noted that the said plates form paths represented by dotted lines 17, 18 and 19, each path through the lens being longer than the length of the immediately adjacent outer path. Line 21 represents the spherical front of the waves radiating from horn 13 which are converted into a plane wavefront 22. As shown by ray 24, the direction of propagation and the electric vector 23 determine a plane which is perpendicular to the planes of lens plates 16. The result of this polarization is that the velocity of the energy waves passing through the lens is substantially the same as the velocity in free space. It is evident from Fig. 1 that the rays 24, 25 and 26 which are exemplary of the rays making up the waves, must each traverse an equal path length in order to form an equi-phase plane 22. The paths 17, 18 and 19 through the lens 15 provide equal total path lengths for the rays 25, 24 and 26 respectively whereby the spherical wavefront 21 is transformed into the plane wavefront 22 upon passing through the lens.

An important feature of the invention is the symmetrical distribution of energy over the radiating face of the lens. In this regard, reference to Fig. 1 discloses that each ray impinging on the feed face of the lens, radiates from the corresponding opposite point on the radiating face of the lens. The uniform distribution of energy resulting therefrom provides a lens of high efficiency.

Figure 2:
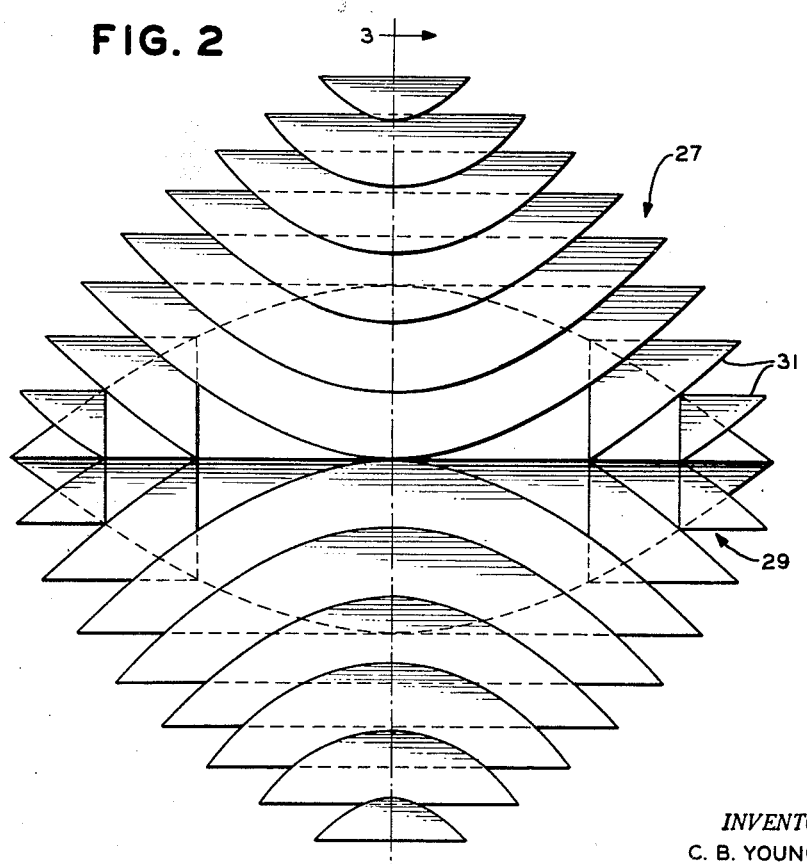
Fig. 2 is a front view showing the face of one form of lens illustrating the invention.
Figure 3:
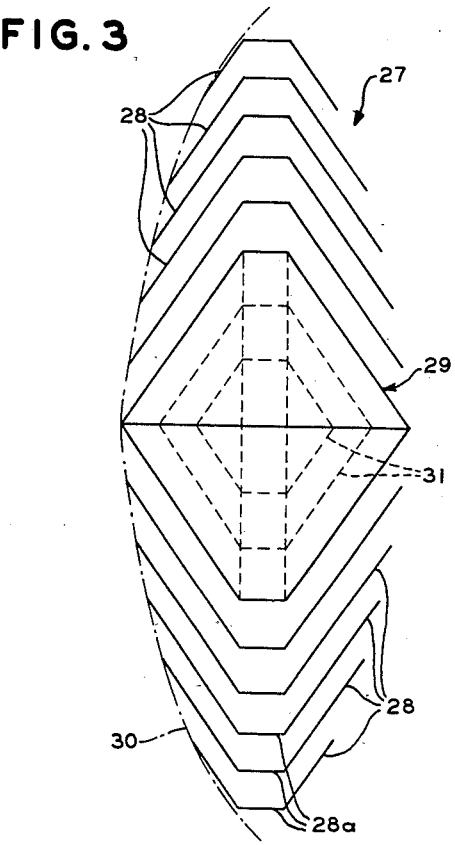
Fig. 3 is a sectional view taken on the line 3—3 of Fig. 2.
Figure 4:
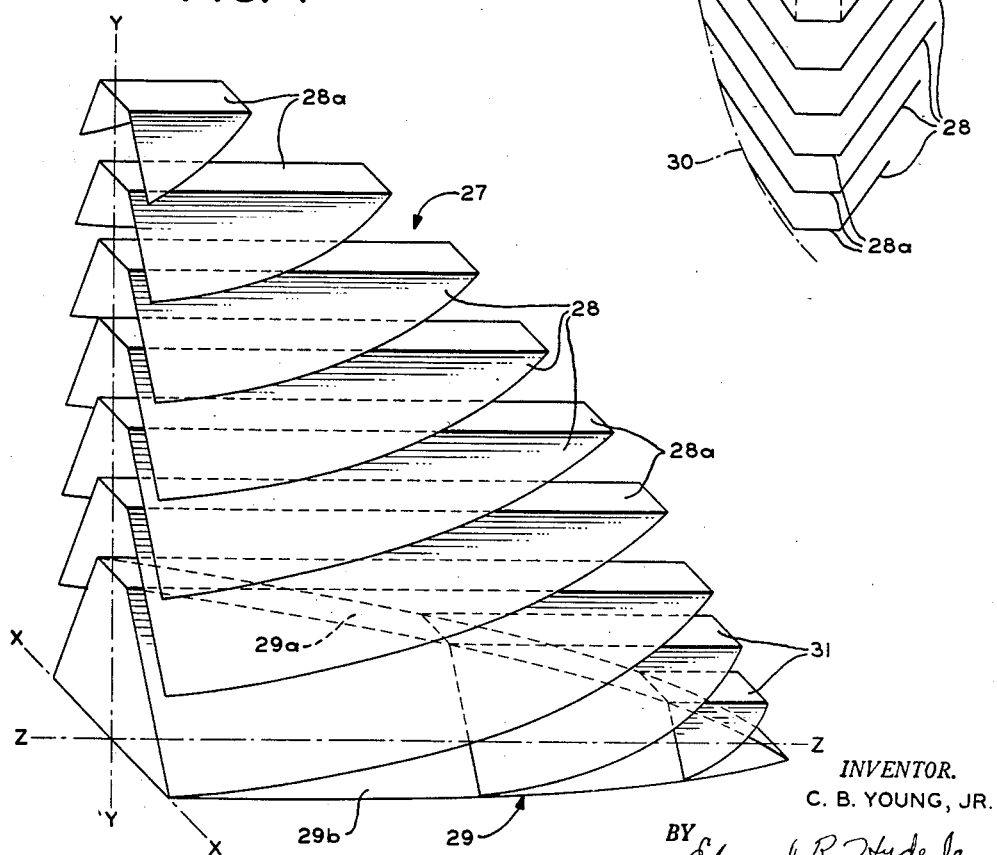
Fig. 4 is a perspective view of one quadrant of the lens of Figs. 2 and 3.

Referring to Figs. 2, 3 and 4, there is shown one preferred embodiment of a lens structure designed in accordance with the principles of this invention. The lens assembly 27 includes a plurality of trough-shaped plates 28. Each of said plates consists of a flat rectangular base 28a and outwardly flaring sides the outer periphery of which conform to a hyperbolic curve. Considering the bottom half of Figs. 2 and 3, it is seen that a plurality of trough-shaped plates 28 are positioned one above the other with the sides extending upward and overlapping each next succeeding plate. The length of the base 28a and width of the sides of succeeeding plates, in a direction inward from the lens periphery, are greater than each preceeding plate. The upper part of the lens as shown in Figs. 2 and 3 comprises a stacked overlapping arrangement similar to the lower half of the lens but inverted, thereby forming an assembly symmetrical with respect to the plane of X—Z axes. The base sections 28a of the plates 28 are all of equal width. Also, the perpendicular distance between the sides of adjacent parallel plates is the same throughout the assembly. Line 30 is a hyperbolic curve and indicates the contour of the lens face across any diameter thereof. It is seen, therefore, that the lens face is formed as a hyperbolic surface of revolution about the X axis.

The center section 29 of the lens is best illustrated by Fig. 4 wherein one quadrant thereof is shown. It is apparent from this figure that the lens is symmetrical with respect to each of the three principal planes. The said center section may be either a solid element or a hollow assembly of sheet metal plates. In either construction, the top surface 29a is hyperbolic in a direction lateral of the lens and straight longitudinal thereof. Each side 29b is a curved surface flaring outward from the top surface 29a and intersecting the plane of the X—Z axis in a hyperbola, as clearly shown in Fig. 4. The bottom half of the center section is identical to the top half but inverted with respect thereto, thereby forming a closed envelope. The section is completed by members 31 secured to the center section in any suitable manner such as soldering. Members 31 comprise end segments of trough-shaped plates similar to plates 28 described above.

Figure 5:
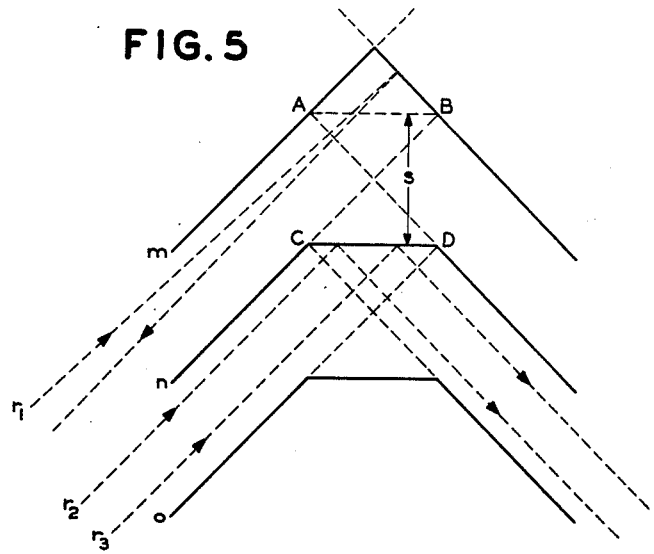
Fig. 5 illustrates a method of determining the width of the base of a lens plate.

One method of determining the width of the flat portion of each plate 28 is shown in Fig. 5. If the plates were in the form of inverted V's, as shown by plate m, a large portion of the energy rays would be reflected back to the source as indicated by ray $r_1$. This reflection is substantially eliminated by the trough bases AB and CD which are determined as shown. The source side of plate n is extended through C and the beam side of plate n is extended through D. The intersections on the sides of plate m define the base AB. Similarly, the extensions of the sides of plate o define the base CD of plate n. The reflections of the type indicated by ray $r_1$ are therefore eliminated as shown by rays $r_2$ and $r_3$. The distance s is less than a half wave length to prevent the transmission of higher order modes. It is therefore seen that the number of plates in a particular lens will depend upon the wavelength of the waves and the desired diameter of the lens.

It is understood that various other methods may be employed for determining the flat or base portion of the trough-shaped plates. Fig. 5 merely represents one method that has been conveniently used to give very satisfactory results.

Figure 6:
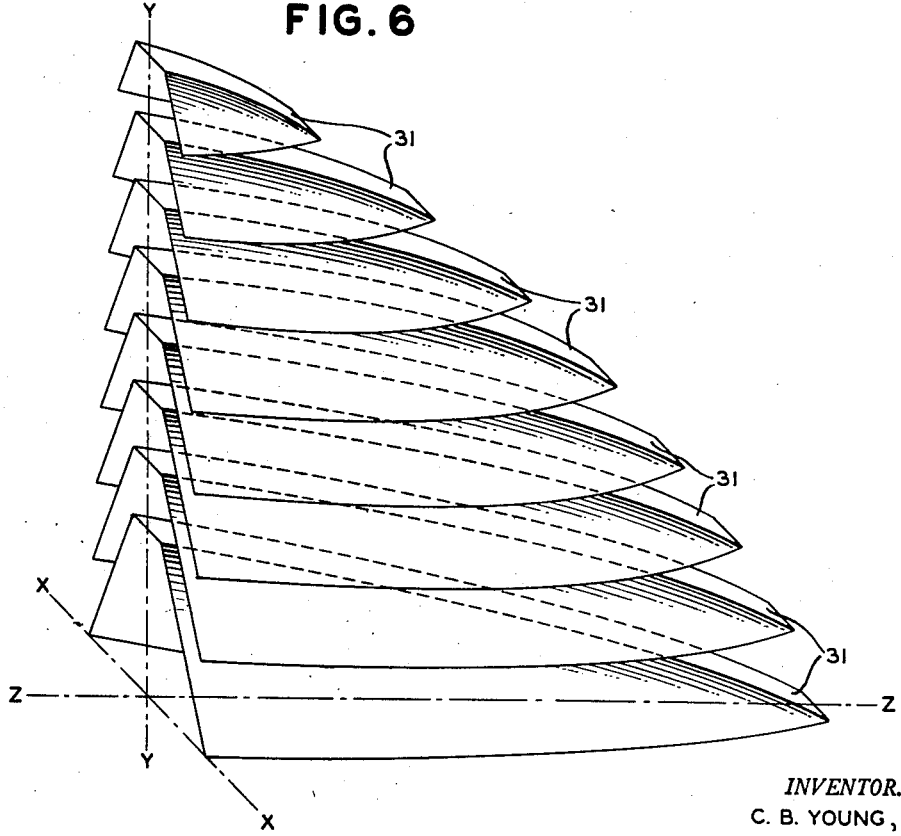
Fig. 6 is a perspective view of one quadrant of another lens designed in accordance with the principles of the invention.
Figure 7A:
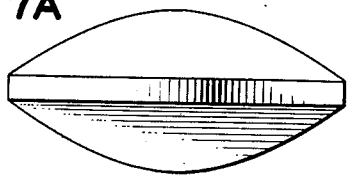
Figs. 7a, 7b and 7c show one plate of the lens of Fig. 6 in plan, elevation and end view respectively.
Figure 7B:
Figure 7C:
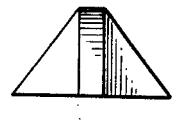

Figs. 6, 7a, 7b and 7c show an embodiment of the invention wherein a separate center section as described above is eliminated. The lens is made of a plurality of trough-shaped plates symmetrical with respect to the plane of the X—Z axes. The base 31 of each trough is curvilinear, preferably hyperbolic, in the lateral direction and straight in the longitudinal direction of wave propagation. The views of Figs. 6 and 7 disclose the trough-shaped plates of the upper portion of the lens, which are inverted duplicates of the bottom plates. The base 31 of each plate is therefore seen as the upper section thereof in these figures. The side of each plate is a curved surface flaring outward from the base 31 and terminating in a preferably hyperbolic curve in a plane parallel to the plane of the X—Z axes. Figs. 7a, 7b and 7c disclose a plan view, side elevation and end view respectively of an individual plate of Fig. 6.

Figure 8:
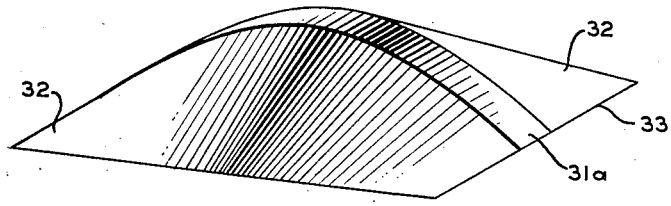
Fig. 8 is a perspective view of one plate of a modification of the lens of Figs. 6, 7a, 7b and 7c.

The individual plates of the embodiment illustrated in Figs. 6 and 7 may be modified as shown in Fig. 8. As therein disclosed, the base 31a is of similar contour as base 31. However, the outward flaring curved sides are extended at each end 32 of the plate, and terminate in a straight edge 33. As is apparent, this modification also eliminates the necessity of a separate center section.

Figure 9:
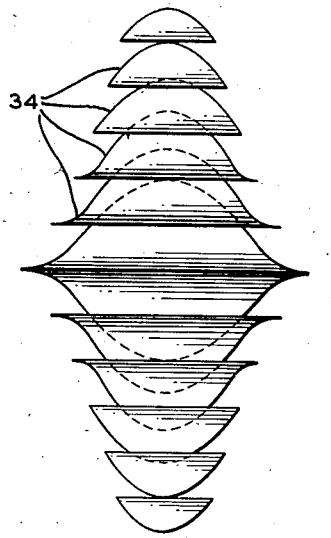
Fig. 9 is an end view of a lens illustrating a further modification of the lens of Figs. 6, 7a, 7b and 7c.

In the above described embodiments of the invention, the base of each plate is disclosed as straight in a longitudinal direction. This feature is dictated merely by convenience of manufacture. From a standpoint of efficiency, a smooth curve is equally satisfactory and in many cases gives optimum results. Fig. 9 illustrates an end view of a modification of the lens of Figs. 6 and 7. It is seen that the sides and base of trough-shaped plates 34 are formed as smooth curves in a longitudinal direction as well as laterally.

Figure 10:
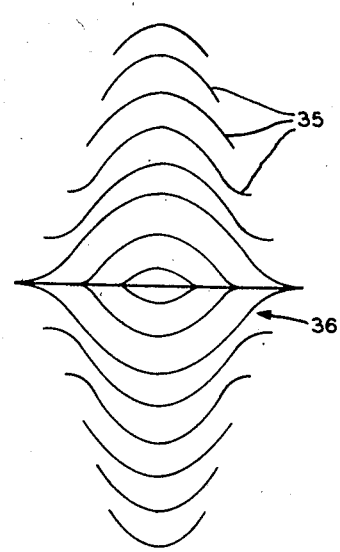
Fig. 10 is an end view of a lens illustrating a modification of the lens of Figs. 2, 3 and 4.

Fig. 10 is a modification of the embodiment of Figs. 2, 3 and 4 wherein the base of trough 35 is straight laterally but curved longitudinally or in the direction of wave propagation. It is apparent that in this modification, a separate center section 36 is required similar to that shown in Figs. 2, 3 and 4.

The embodiments of the invention have been disclosed as employing metal plates as deflecting members. However, a grid structure wherein the distance between wires is less than half a wavelength may be substituted for each plate. The two are considered equivalent for waves polarized with respect to the lens as shown in Fig. 1.

While the lens has been disclosed in connection with transverse electromagnetic waves, its utility is not so limited. Experience has shown that other type waves such as various acoustical waves may be equally well focused.

While certain specific embodiments of the invention have been disclosed, it is understood that these are not to be construed as limiting the invention as defined in the appended claims.

I claim:

1. A microwave lens of the path length delay type comprising a plurality of substantially parallel conducting wave deflecting members arranged in overlapping stacked relation, each of said members being trough-shaped and comprising a single base and two outwardly flaring sides, successive members of said stack being of smaller size then each preceding member.

2. A lens of the character described comprising two sections symmetrical with respect to an axial plane of said lens, each section including a plurality of substantially parallel wave deflecting members arranged in stacked relation and progressively decreasing in size laterally and longitudinally thereof in a direction away from said plane, each of said deflecting members being trough-shaped and including a base and two outwardly flaring sides.

3. A lens device of the character described comprising two sections symmetrical with respect to an axial plane of said lens, each section including a plurality of substantially parallel wave deflecting members arranged in stacked relation and decreasing in size in a direction away from said plane thereby forming a double convex contour, each of said deflecting members being trough-shaped and including a single base and two outwardly flaring sides whereby a ray of energy impinging at a point on one face of the lens will be emitted from the corresponding opposite point on the other face of said lens.

4. In a microwave lens of the path length delay type, two sections symmetrical with respect to a common plane, each section including a plurality of parallel conducting wave deflecting members of sheet material arranged in overlapped stacked relation and progressively decreasing in size in a direction away from said plane thereby forming a convex contour.

5. A microwave lens of the path length delay type comprising two sections symmetrical with respect to a common plane, each section including a plurality of substantially parallel conducting wave deflecting members arranged in overlapping stack relation decreasing in size in a direction away from said plane thereby forming a double convex lens each face of which defines a hyperbolic surface, each of said deflecting members being trough-shaped and including a base and two outwardly flaring sides whereby a ray of energy impinging at a point on one face of the lens will be emitted from the corresponding opposite point on the other face of said lens.

6. A microwave lens of the path length delay type comprising two sections symetrical with respect to an axial plane of said lens, each section including a plurality of substantially parallel wave deflecting members arranged in stacked relation and decreasing in size in a direction away from said plane, each of said deflecting members being trough-shaped and including a flat elongated base and two outwardly flaring sides.

7. A microwave lens as defined in claim 6 in which the sides of each trough-shaped deflecting member terminate at the outer edge in a hyperbolic curve.

8. A microwave lens as defined in claim 6 including a center section located between said two sections symmetrical with respect to said axial plane and having outer edges tapering toward said plane.

9. A microwave lens of the path length delay type comprising two sections symmetrical with respect to a common plane, each section including a plurality of substantially parallel conducting wave deflecting members arranged in overlapping stacked relation decreasing in size in a direction away from said plane thereby forming a double convex lens each face of which defines a hyperbolic surface, each of said deflecting members being trough-shaped and including a flat base and two outwardly flaring sides whereby a ray of energy impinging at a point on one face of the lens will be emitted from the corresponding opposite point on the other face of said lens.

10. A microwave lens as defined in claim 9 in which the sides of each trough-shaped deflecting member terminate at the outer edge in a smooth curve.

11. A microwave lens of the path length delay type comprising two sections symmetrical with respect to an axial plane of said lens, each section including a plurality of substantially parallel wave deflecting members arranged in stacked relation and decreasing in size in a direction away from said plane, each of said deflecting members being trough-shaped and including a base forming a hyperbolic curve laterally thereof and two outwardly flaring sides.

12. A microwave lens as defined in claim 11 in which the base of each said trough-shaped deflecting member is straight in a direction laterally of said member.

13. A microwave lens of the path length delay type comprising two sections symmetrical with respect to a common plane, each section including a plurality of substantially parallel conducting wave deflecting members arranged in overlapping stacked relation decreasing in size in a direction away from said plane thereby forming a double convex lens each face of which defines a hyperbolic surface, each of said deflecting members being trough-shaped and including a base, hyperbolically curved laterally and straight in a longitudinal direction, and two outwardly flaring sides whereby a ray of energy impinging at a point on one face of the lens will be emitted from the corresponding opposite point on the other face of said lens.

14. A microwave lens as defined in claim 13 wherein the ends of each of said two sides terminate in a straight edge collinear with an end of the corresponding base.

15. A microwave lens of the path length delay type comprising two sections symmetrical with respect to an axial plane of said lens, each section including a plurality of substantially parallel wave deflecting members arranged in stacked relation and decreasing in size in a direction away from said plane, each of said deflecting members being trough-shaped and including a base and two sides forming a continuous curved surface longitudinally of said trough.

16. A microwave lens as defined in claim 15 wherein the base of each said trough-shaped deflecting member is hyperbolically curved laterally thereof.

17. A microwave lens as defined in claim 15 wherein the base of said trough is straight longitudinally thereof.

18. A lens of the path length delay type for adjusting the phase of radiant energy comprising a plurality of parallel wave deflecting members of sheet material arranged in overlapping stacked relation and progressively decreasing in size laterally and longitudinally thereof to form a three dimensional lens of convex outer contour, each of said deflecting members being trough shaped and including a base and two outwardly flaring sides, whereby a ray of energy impinging at a point on one face of the lens will be emitted from the corresponding opposite point on the other face of the lens.

19. A lens of the character described comprising two sections symmetrical with respect to an axial plane of said lens, each section comprising a plurality of wave deflecting members of sheet material arranged in stacked relation and progressively decreasing in size laterally and longitudinally in a direction away from said plane thereby forming a three dimensional lens of convex outer contour, each of said deflecting members being trough shaped and including a base portion and two outwardly flaring sides.

References Cited in the file of this patent

UNITED STATES PATENTS

| | | |
|---|---|---|
| 2,442,951 | Iams | June 8, 1948 |
| 2,528,582 | De Vore | Nov. 7, 1950 |
| 2,530,826 | Kock | Nov. 21, 1950 |
| 2,596,251 | Kock | May 13, 1952 |
| 2,640,154 | Kock | May 26, 1953 |